(12) United States Patent
    Kinnich

(10) Patent No.: US 11,177,531 B2
(45) Date of Patent: Nov. 16, 2021

(54) APPARATUS AND SYSTEM FOR LOCKING A BATTERY TO A TRANSPORTATION DEVICE

(71) Applicant: David Kinnich, Chicago, IL (US)

(72) Inventor: David Kinnich, Chicago, IL (US)

( * ) Notice: Subject to any disclaimer, the term of this patent is extended or adjusted under 35 U.S.C. 154(b) by 254 days.

(21) Appl. No.: 16/559,487

(22) Filed: Sep. 3, 2019

(65) Prior Publication Data

US 2020/0075924 A1    Mar. 5, 2020

Related U.S. Application Data

(60) Provisional application No. 62/725,915, filed on Aug. 31, 2018.

(51) Int. Cl.
| | |
|---|---|
| *H01M 50/262* | (2021.01) |
| *H01M 50/249* | (2021.01) |
| *F16B 41/00* | (2006.01) |
| *H01M 50/247* | (2021.01) |
| *H01M 50/244* | (2021.01) |
| *B62H 5/00* | (2006.01) |
| *A63C 17/12* | (2006.01) |

(52) U.S. Cl.
    CPC ......... *H01M 50/262* (2021.01); *F16B 41/005* (2013.01); *H01M 50/244* (2021.01); *H01M 50/247* (2021.01); *H01M 50/249* (2021.01); *A63C 17/12* (2013.01); *B62H 5/001* (2013.01); *H01M 2220/20* (2013.01); *H01M 2220/30* (2013.01)

(58) Field of Classification Search
    None
    See application file for complete search history.

(56) References Cited

U.S. PATENT DOCUMENTS

| | | |
|---|---|---|
| 4,773,239 A | 9/1988 | Lowe et al. |
| 5,040,385 A | 8/1991 | Randone |
| 5,769,438 A | 6/1998 | Svetlov |
| 5,901,588 A | 5/1999 | Frost |
| 6,230,526 B1 | 5/2001 | Fontes et al. |
| 6,360,405 B1 | 3/2002 | McDaid et al. |
| 2005/0028571 A1 | 2/2005 | Merrem et al. |
| 2005/0142961 A1 | 6/2005 | Tan |
| 2005/0150262 A1 | 7/2005 | Murray et al. |
| 2006/0108296 A1 | 5/2006 | Loch |
| 2008/0173596 A1 | 7/2008 | Loch |
| 2013/0081891 A1 | 4/2013 | Ulmen et al. |
| 2013/0305790 A1 | 11/2013 | Seele et al. |
| 2014/0266588 A1 | 9/2014 | Majzoobi |

(Continued)

*Primary Examiner* — Eugenia Wang
(74) *Attorney, Agent, or Firm* — Neal, Gerber & Eisenberg LLP

(57) ABSTRACT

Described herein are systems and apparatuses for securing and locking a battery or battery enclosure to a vehicle. In general, a vehicle may include a planar body mounted to any number of wheels, tracks, wings or flotation devices. In a preferred embodiment, the security device comprises a security plate and a locking pin system is used to secure the battery to any vehicle. The security plate is positioned between the fastener heads and the battery enclosure and has an opening for the locking pin to slide through. Once the pin is inserted into security plate the pin lock secures the pin in place and prevents removal of the battery or battery enclosure from the vehicle.

17 Claims, 3 Drawing Sheets

(56) References Cited

U.S. PATENT DOCUMENTS

| | | |
|---|---|---|
| 2014/0277888 A1 | 9/2014 | Dastoor et al. |
| 2016/0348403 A1 | 12/2016 | Denny |
| 2018/0104567 A1 | 4/2018 | Treadway et al. |
| 2018/0236348 A1 | 8/2018 | Evans et al. |
| 2018/0241022 A1* | 8/2018 | Nishihara ............... B60L 50/64 |
| 2019/0091551 A1 | 3/2019 | Rautiainen et al. |
| 2019/0091552 A1 | 3/2019 | Bluhm et al. |
| 2019/0091553 A1 | 3/2019 | Rautiainen et al. |
| 2019/0184265 A1 | 6/2019 | Micacchi |
| 2019/0226244 A1 | 7/2019 | Kinnich |

\* cited by examiner

APPARATUS AND SYSTEM FOR LOCKING A BATTERY TO A TRANSPORTATION DEVICE

CROSS-REFERENCE TO RELATED APPLICATIONS

This application claims benefit of the filing date of and right of priority to U.S. Provisional Application No. 62/725,915, filed Aug. 31, 2018.

FIELD OF THE INVENTION

The present subject matter relates generally to a security device. More specifically, the present invention relates to a security device adapted for locking a battery enclosure to a vehicle.

BACKGROUND OF THE INVENTION

Electric bicycles, electric skateboards and other electric vehicles are a popular method of transportation and recreation. They are easy to secure outside at a bike rack or other locking area with a bike lock that many have become accustomed too. While a bike lock or board lock can secure a normal bicycle or electric bicycle all the same, one of the most expensive components with electric vehicles is the battery module. Current electric vehicles leave their batteries unprotected and susceptible to theft.

Electric bicycles, hoverboards, and electric skateboards are becoming increasingly popular and accordingly, there is a need for a security device for a battery, battery system or battery enclosure.

BRIEF SUMMARY OF THE INVENTION

As one aspect of the present invention, a security system is provided for securing a battery to an electric vehicle. The security system comprises a battery enclosure that comprises one or more fastener apertures (such as through-holes in one or more flanges of the battery enclosure) configured for receiving an elongated fastener (screws, bolts, etc.) to fasten the battery enclosure to the electric vehicle. The security system also comprises a security plate having one or more fastener holes aligned with fastener apertures of the battery enclosure. The security system also comprises one or more elongated fasteners (such as mounting bolts) that fasten (a) the security plate to the battery enclosure and (b) the battery enclosure to the electric vehicle, wherein the one or more elongated fasteners extend through the fastener holes of the security plate into the fastener apertures of the battery enclosure. The security system also comprises a blocking pin that substantially blocks access to the elongated fasteners. In some embodiments, the blocking portion of the pin substantially fills the cavity and/or prevents access to all of the fastener holes of the security device. The security system also comprises a pin slot for receiving an end of the blocking pin. The pin slot can be substantially perpendicular to the fastener apertures. The security system also comprises a lock that locks the blocking pin in the pin slot.

As another aspect of the present invention, a security device is provided for preventing removal of an elongated fastener that attaches a battery enclosure to an electric vehicle. The security device comprises a security plate and a pin. The security plate comprises a base having top and bottom major surfaces, and one or more fastener holes extending through the base. The security plate also comprises a front wall rising from the top major surface of the base, wherein the front wall is substantially perpendicular to the top major surface. The security plate also comprises a pin opening in the front wall having a pin slot cross-section. The pin of the security device comprises an insertion portion having a cross-section that is smaller than the pin slot cross section, and a blocking portion that extends over one or more of the fastener holes. The security device includes a lock for locking the pin in the pin slot.

In some embodiments, the pin slot is a through hole in the front wall of the security plate. In some embodiments, the pin slot comprises a lock feature (such as a cam) for engaging the pin. In some embodiments, the pin has a recessed (such as threaded or spiral) portion, and the lock comprises a protrusion that engages the threaded or spiral portion of the pin. In some embodiments, the pin further comprises a head portion that prevents the pin from completely passing through the pin slot. In some embodiments, the lock comprises a collar having a collar cross-section larger than the pin slot cross-section.

As yet another aspect, the present invention relates to an electric vehicle comprising a security system or security device as described herein. For example, the present invention in some aspects includes electric vehicles such as skateboards having the present security system protecting its battery.

This invention relates generally to locking devices and apparatus, more specifically to a locking apparatus for securing battery systems, and in particular to security and locking devices for electric vehicles including bicycles, skateboards, hoverboards, segway and other types of rideable boards and transportation devices.

Described herein are apparatuses and systems for locking and securing a battery to an electric vehicle. In general, an electric vehicle optionally includes wheels or tracks mounted a planar body or fixed frame on which the operator rides or sits. In general, examples include but are not limited to electric bicycles, skateboards, unicycles, segway type vehicle, hoverboards.

In some embodiments the battery is mounted directly to the vehicle. In some embodiments the battery is housed in an enclosure that mounts directly to the vehicle. In some embodiments the battery is system of cells that get mounted or attached onto the vehicle. In some embodiments the battery slides or gets attached to the vehicle with pins or snaps. In some embodiments the battery or enclosure is attached with screws or mounting bolts. In some embodiments the battery slides into place with a pouch.

In some embodiments the battery is mounted to the vehicle. In some embodiments the security plate is placed in between the mounting bolts and the battery enclosure. In some embodiments the security plate is placed between the mounting bolts and the battery or battery system.

In some embodiments the security plate has walls or enclosures built up from the base of the plate. For example, the security plate may have a front wall extending from a surface of the security plate, and the front wall can have a pin opening configured to receive a blocking pin. The security plate can have side walls and a back wall, and the walls can be positioned to define a cavity, in which the mounting bolts reside. In some embodiments the security plate has a hole in which to slide in and out a pin. In some embodiments the security plate is built into the battery enclosure or system. In some embodiments the security plate has more than one wall. In some embodiments the pin slides into the security plate and covers the mounting bolts from above. In some embodiments the locking pin covers the mounting bolts from the side or other angle. In some embodiments the pin covers one or more mounting bolts. In some embodiments the locking device is then slide over the pin and locked in place. In some embodiments this now covers all the mounting bolts and prevents their removal. Other ways possible: the pin can be a sliding joint or square, rectangular, triangle or flat shaped length that would cover the mounting bolts.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

DETAILED DESCRIPTION OF THE DRAWINGS

The following description of the preferred embodiments of the invention is not intended to limit the invention to these preferred embodiments, but rather to enable any person skilled in the art to make and use this invention. Disclosed herein are an apparatus and system for securing a rideable board to a fixed object.

In general electric vehicles will have an apparatus or housing that mounts, attaches or otherwise affixes the battery or batteries to the vehicle. In some embodiments this housing is mounted in or onto the vehicle so as to be modular, swappable and portable. In some embodiments the battery is mounted in a housing which is affixed to the electric vehicle.

In some embodiments a battery enclosure may be mounted to an electric vehicle. A battery enclosure refers to a structure that encloses a battery, preventing access to it. It is contemplated that the battery can be a separate piece from the battery enclosure or they may be integral or a single piece. In some embodiments a battery may be mounted directly to the vehicle with no enclosure. In some embodiments the battery or batteries are mounted, fastened or otherwise attached to electric vehicles. In some embodiments these batteries are removable and swappable in the vehicle.

In some embodiments the electric vehicle is a bicycle, unicycle, skateboard or other wheeled device. In some embodiments this is a tracked or multi-wheeled vehicle. In some embodiments this is a floating or flying vehicle. Electric vehicles include electric skateboards, longboards, mountain boards, all-terrain boards, 2-wheel hover boards and inline boards, 1-wheel boards, and other multi-wheel ride-able boards. Electric longboards are commercially available from Acton, Boosted Boards, and others. In general, ride-able boards include traditional skateboards, longboards, cruising boards and other multi-wheeled ride-able boards. Additional information about electric ride-able boards and about batteries and battery enclosures for electric ride-able boards can be found in US Pat. App. Publication Nos. 20180236348; 20180104567; and 20190091552.

As used herein, an elongated fastener refers to a bolt, screw, rivet, or other type of fastener that is rigid, strong and has an end suited for fastening (such as threads). The elongated fastener can comprise a fastener head at an end to facilitate insertion and removal of the elongated fastener. The elongated fastener (more particularly, the head of an elongated fastener) can be configured to engage a tool, such as a screwdriver or a wrench, such as by having a cavity. The fastener head cavity can adapted to engage a tool, such as by being sized and/or shaped to engage a flathead or Phillips screwdriver.

Figure 1:
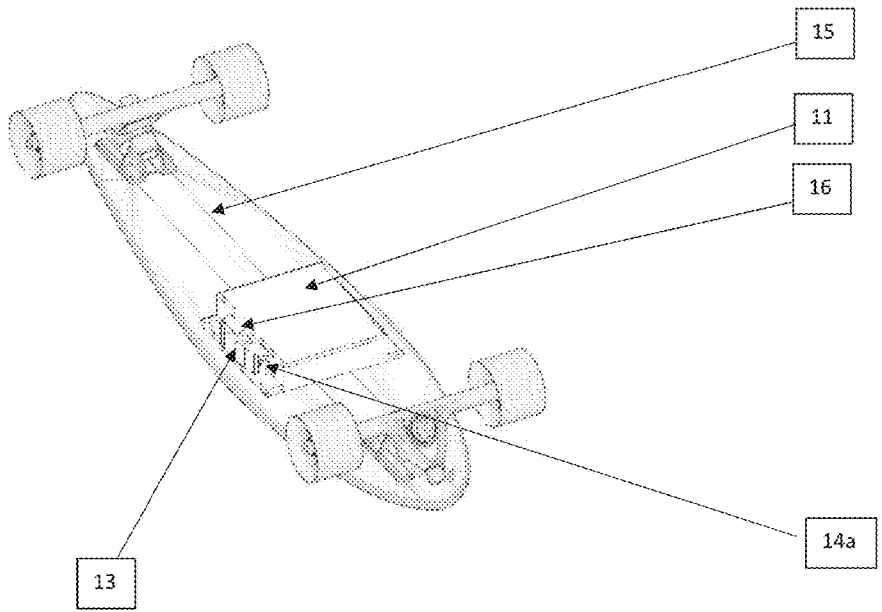
FIG. 1 illustrates a side view of an electric skateboard with a battery and locking system
Figure 2:
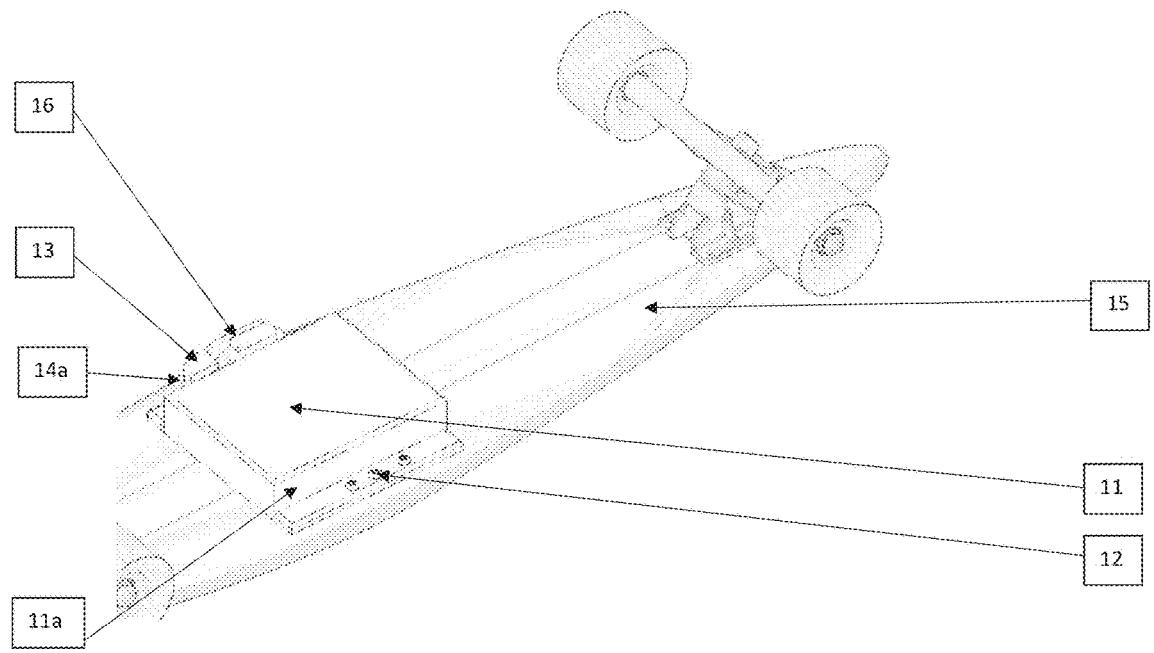
FIG. 2 illustrates a partial side view of an electric skateboard w/battery and locking system
Figure 3:
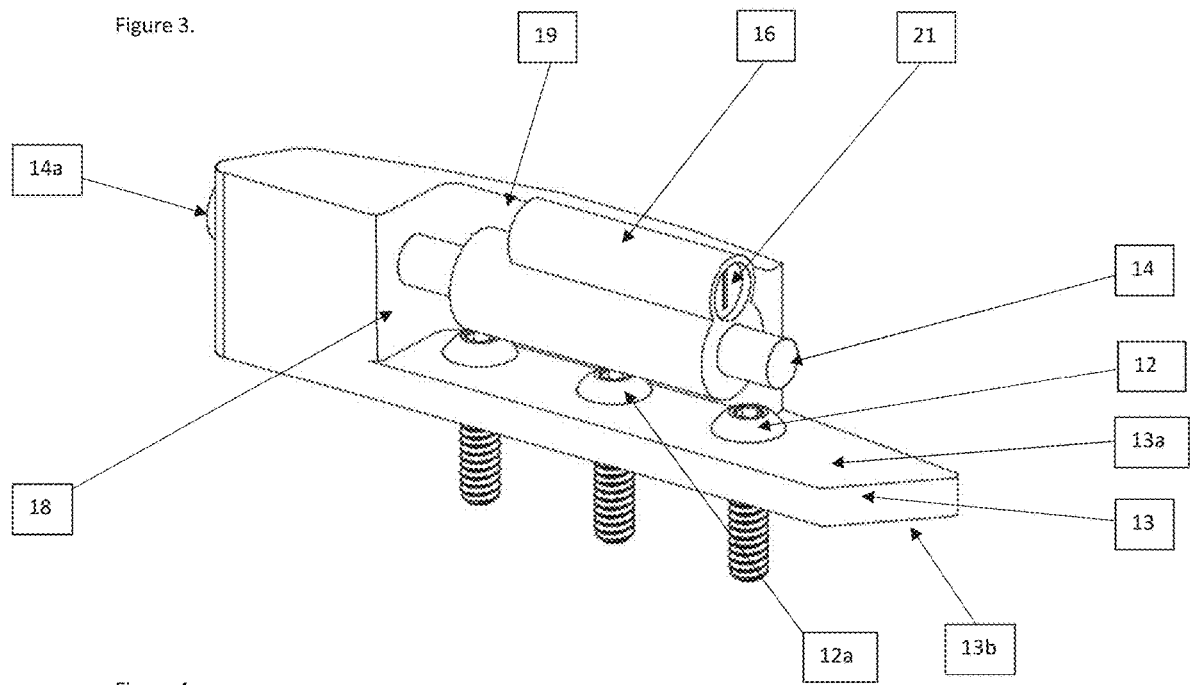
FIG. 3 illustrates a perspective view of mounting bolts with locking apparatus

In some embodiments of the present invention the electric vehicle may be an electric skateboard. In some embodiments as shown in FIGS. 1 and 2 a planar body or skateboard 15 may include at least one battery or battery housing 11 coupled to the bottom of the planar body or vehicle. In some embodiments, as shown in FIG. 2, the battery or battery enclosure 11 is coupled to the bottom of the vehicle with at least one mounting bolts 12. In some embodiments, as shown in FIG. 1, the security plate 13 is installed on at least one side of the battery enclosure 11. In some embodiments, as shown in FIG. 3, the security plate has three mounting bolts 12 that engage with it, the pin 14 interacts with the security plate 13 by sliding through it and finally being secured by the pin lock 16. Pin lock 16 comprises a lock mechanism 21 having a keyhole in which a key can be inserted and turned, causing pin lock 16 to lock to pin 14. Any suitable locking features can be included in pin lock 16. Security plate 13 has top and bottom major surfaces 13a, 13b. The bottom surface 13b of security plate 13 is substantially flat in FIG. 3, though it can be curved or another shape. For instance, a substantially flat bottom surface may be desirable for a security device for a rideable board, and a curved bottom surface may be desirable for a security device for a bicycle, since the battery for an electric bicycle may be located on a tubular frame. The security plate 13 has a front wall 18 and a side wall 19 rising from the top major surface 13a, which collectively form a cavity 20 (see FIG. 6).

Another sidewall of cavity 20 can be provided by a side wall 11a of battery enclosure 11. Alternatively, the security plate 13 can have two sidewalls rising from the base, so as to form a cavity enclosed on three of four sides and having an open top. A security plate cavity having an open top permits access to the mounting bolts 12 where pin 14 is not in place. Having an open side (such as the back side opposite the front wall 18) can facilitate insertion, removal and locking of the pin 14.

Figure 4:
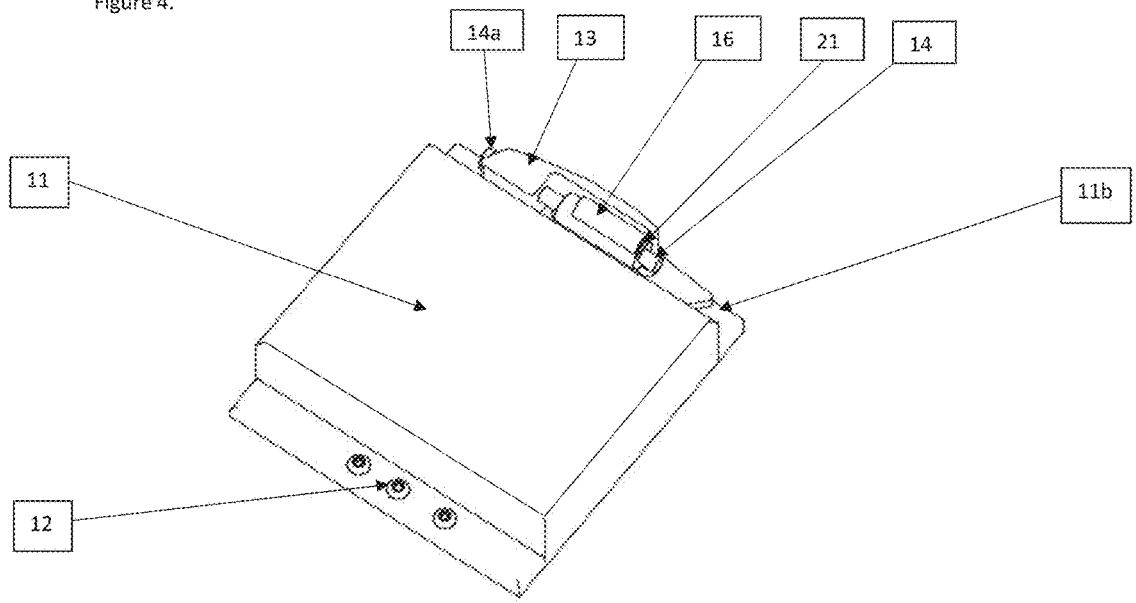
FIG. 4 illustrates a perspective view of top of battery enclosure with locking apparatus
Figure 5:
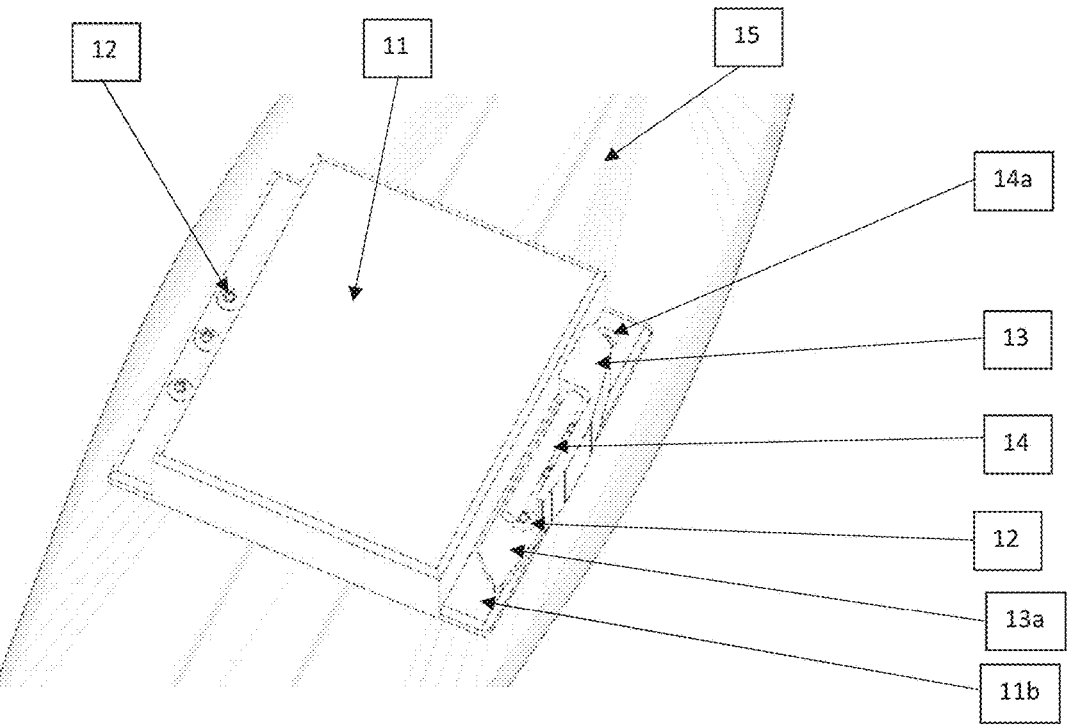
FIG. 5 illustrates perspective view of partial skateboard with battery and security plate with pin

In some embodiments, as shown in FIG. 4, the battery or battery enclosure has two mounting bolts 12 sides, one with the security plate 13 already installed. In some embodiments, as shown in FIG. 4, the pin 14 slides through the security plate 13 and then is secured by the pin lock 16. In some embodiments, as shown in FIG. 5, the battery enclosure 11 is affixed to the bottom of a wheeled vehicle. In some embodiments, as shown in FIG. 5, the battery enclosure 11, is affixed to the vehicle by two sets of three mounting bolts 12, on either side. In some embodiments, as shown in FIG. 5, the security plate 13 is installed above the battery enclosure and then affixed with the mounting bolts 12. The base of the security plate 13 is between the heads of 12a of the mounting bolts 12 and the flange 11b of battery enclosure 11.

Figure 6:
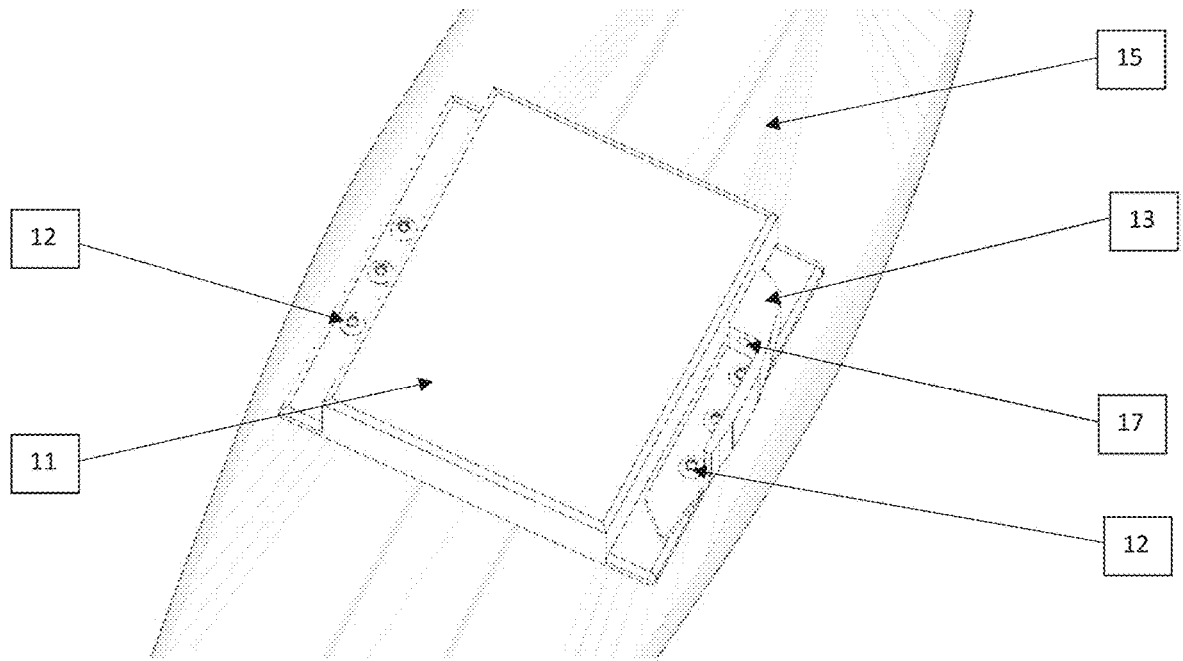
FIG. 6 illustrates perspective view of partial electric skateboard with battery and security plate

In some embodiments, as shown in FIG. 6, the security plate 13 is affixed with three mounting bolts 12. In some embodiments, as shown in FIG. 6, the security plate 13 has one pin slot 17 that allows the pin to slide into. In some embodiments, as shown in FIG. 5, the pin 14 has a larger diameter on one side to allow a stoppage at the security plate 13. In some embodiments, as shown in FIG. 5, the pin is slid through the security plate. In some embodiments, as shown in FIG. 4, the pin lock 16 is affixed over the pin to secure it from being removed or advanced in the security plate 13.

When locked in the security plate 13, pin 14 prevents access to the mounting bolts 12. Pin 14 can prevent access by a tool needed to remove the fasteners, such as a screwdriver or a wrench. In some embodiments, pin 14 physically contacts the mounting bolts. In some embodiments, pin 14 does not physically contact the mounting bolts, but a gap of less than 5 mm. In some embodiments the pin is flat, triangle, oval or any various shape or size. The pin can be any suitable size, though usually it will have a cross-section (e.g., the diameter of a cylindrical pin) that is smaller than a cross-section of the pin opening. The pin cross-section (or at least a portion) can be sized and/or shaped so that it can be inserted into the pin opening in a snug or interference fit.

In some embodiments, the pin will comprise an end portion 14a that is larger than the cross-section of the pin opening, so that the end portion 14a cannot pass through. In this way, the pin and the pin opening are configured so that a portion of the pin passes through and extends over the security device's fastener apertures, and the end portion 14a prevents the pin from passing all the way through (and thereby separating from) the pin opening. In other words, only one end of the pin can pass through the pin opening.

In some embodiments the security plate is put on multiple sides of the enclosure. In some embodiments the security plate is built into the battery enclosure. In some embodiments the security plate has more than one wall or side. In some embodiments the security plate has more than one pin hole. In some embodiments the pin has the lock integrated into the end. In some embodiments there is more than one battery enclosure or battery. In some embodiments there is mounting pins, rivets, screws, sliders, or other fastening device in place of mounting bolts. In some embodiments the security plate prevents access to the battery release. In some embodiments the pin is integrated into the security plate.

An advantage of the present security plate is that it does not require special tools or manufacturing to be employed on an electric vehicle. Another advantage of the present security plate is that it need not require additional fasteners, but rather can be fastened to the electric vehicle using the same fasteners that attach the battery or battery enclosure to the vehicle.

The base of the security plate has one or more fastener holes. Although the present figures show three fastener holes, other embodiments can have one, two, four, five or more fastener holes.

In some embodiments, the base of the security plate has a plurality of fastener holes spaced at nonidentical distances, thereby making the security plate adapted for battery enclosures having fastener apertures with different spacing. For example, a security device may have a first fastener hold proximal to the front wall, a second fastener hole 0.75 inch from the first aperture, and a third fastener hole 1 inch from the first aperture, so that the same security plate is adapted for battery enclosures whose fastener apertures are 0.75 inch apart or 1 inch apart.

Holes (also referred to as apertures) for receiving elongated fasteners can be through-holes or dead-ended holes. In some embodiments, the security plate comprises a lock to hold the pin in place with the pin opening. The lock can be a tubular lock however it should be understood that it can be a regular cam lock, combination locks, digital locks, physical locks, biological locks (eye scanner, fingerprint) or other electronic or physical locks.

In some embodiments, the lock comprises a lock mechanism in the security plate. Examples of suitable lock mechanisms include a cam lock, pin tumbler lock, tubular cam lock, dimple key cam lock, hitch pin type lock, ratchet lock, keyless locks, or thumbprint lock. The lock can receive an end or a portion of the pin 14, including by sliding over the pin. The lock mechanism can comprise a cam or protrusion which engages with a locking feature on pin 14 when turned. In some embodiments, the lock can be a cylindrical tumbler lock or a tubular (or radial) tumbler lock. Other lock mechanisms and features can be included in the present security system and security device.

What is claimed is:

1. A security device for preventing removal of an elongated fastener that attaches a battery enclosure to an electric vehicle, the security device comprising:
a security plate comprising:
a base having top and bottom major surfaces, and one or more fastener holes extending through the base;
a front wall rising from the top major surface of the base, wherein the front wall is substantially perpendicular to the top major surface;
a pin opening in the front wall having a pin slot cross-section;
a pin comprising an insertion portion having a cross-section that is smaller than the pin slot cross section, and a blocking portion that extends over one or more of the fastener holes;
a lock that locks the pin in the pin slot.

2. The security device of claim 1, wherein the pin slot is a through hole in the front wall of the security plate.

3. The security device of claim 1, wherein the pin slot comprises a lock feature for engaging the pin.

4. The security device of claim 1, wherein the pin has a recessed portion, and the lock comprises a protrusion that engages the threaded or spiral portion of the pin.

5. The security device of claim 4, wherein the pin further comprises a head portion that prevents the pin from completely passing through the pin slot.

6. The security device of claim 5, wherein the lock comprises a collar having a collar cross-section larger than the pin slot cross-section.

7. The security device of claim 1, wherein the bottom major surface of the base is essentially flat or curved.

8. The security device of claim 1, wherein the pin opening in the front wall is substantially perpendicular to the base.

9. The security device of claim 1, wherein the security plate comprises one side wall rising from the top major surface of the base and substantially perpendicular to the front wall, wherein the front wall and the side wall define a cavity.

10. The security device of claim 1, wherein the security plate comprises one or more side walls rising from the top major surface of the base, wherein the front wall and the one or more side walls define a cavity.

11. The security device of claim 10, wherein the blocking portion of the pin substantially fills the cavity and/or prevents access to all of the fastener holes of the security device.

12. The security device of claim 10, wherein the security device has an open side opposite the front wall.

13. A security system for securing a battery to an electric vehicle, the security system comprising:
- a battery enclosure that comprises one or more fastener apertures each configured for receiving an elongated fastener to fasten the battery enclosure to the electric vehicle;
- a security plate comprising one or more fastener holes aligned with fastener apertures of the battery enclosure;
- one or more elongated fasteners that fasten (a) the security plate to the battery enclosure and (b) the battery enclosure to the electric vehicle, wherein the one or more elongated fasteners extend through the fastener holes of the security plate into the fastener apertures of the battery enclosure;
- a pin that substantially blocks access to the one or more elongated fasteners;
- a pin slot for receiving an end of the blocking pin; and
- a lock that locks the pin in the pin slot.

14. The security system of claim 13, wherein the security plate is integral with the battery enclosure.

15. The security system of claim 13, wherein the elongated fasteners have fastener heads configured to engage a tool.

16. An electric vehicle comprising the security system of claim 13.

17. The electric vehicle of claim 16, wherein the electric vehicle is a skateboard.

* * * * *